US011773809B2

(12) United States Patent
Harriger et al.

(10) Patent No.: US 11,773,809 B2
(45) Date of Patent: Oct. 3, 2023

(54) EVAPORATIVE EMISSIONS LEAK CHECK MODULE WITH INTEGRATED CONTROL AND COMMUNICATION SYSTEM

(71) Applicant: Stoneridge Control Devices, Inc., Novi, MI (US)

(72) Inventors: Benjamin Allen Harriger, Bellville, OH (US); Robert James Steinman, Lexington, OH (US); Trevor Adam Pryor, Mt. Gilead, OH (US); Mark William Peters, Wolverine Lake, MI (US)

(73) Assignee: STONERIDGE CONTROL DEVICES, INC., Novi, MI (US)

( * ) Notice: Subject to any disclaimer, the term of this patent is extended or adjusted under 35 U.S.C. 154(b) by 0 days.

(21) Appl. No.: 17/882,055

(22) Filed: Aug. 5, 2022

(65) Prior Publication Data

US 2023/0095906 A1 Mar. 30, 2023

Related U.S. Application Data

(60) Provisional application No. 63/247,873, filed on Sep. 24, 2021.

(51) Int. Cl.
*F02M 25/08* (2006.01)

(52) U.S. Cl.
CPC .... *F02M 25/0818* (2013.01); *F02M 25/0836* (2013.01); *F02M 25/0854* (2013.01); *F02M 2025/0845* (2013.01)

(58) Field of Classification Search
CPC ........... F02M 25/0818; F02M 25/0836; F02M 25/0854; F02M 2025/0845; F02M 25/089; G01M 3/26; G01M 3/025
See application file for complete search history.

(56) References Cited

U.S. PATENT DOCUMENTS 6,192,743 B1 2/2001 Perry
7,043,375 B2 5/2006 Streib
(Continued)

FOREIGN PATENT DOCUMENTS

WO 2021067031 A1 4/2021
WO 2022060794 A1 3/2022

OTHER PUBLICATIONS

International Search Report and Written Opinion for International Application No. PCT/US2022/039552 dated Jan. 11, 2023.
(Continued)

*Primary Examiner* — Xiao En Mo
(74) *Attorney, Agent, or Firm* — Carlson, Gaskey & Olds, P.C.

(57) ABSTRACT

A leak detection module (LDM) includes a housing, a canister valve solenoid (CVS) that is arranged within the housing and in fluid communication along a first fluid passageway between first and second ports. The module also includes a pump that is arranged within the housing and is in fluid communication with the first and second ports, and a pressure sensor that is in fluid communication with at least one of the first and second ports. A first controller is arranged in the housing and is in communication with the pump, the CVS and the pressure sensor. The first controller runs a test procedure using the pump and operating the CVS between open and closed positions to monitor a pressure within the module. The first controller communicates a result based upon the monitored pressure to a second controller that is arranged outside the housing and remotely from the module.

20 Claims, 5 Drawing Sheets

(56) References Cited

U.S. PATENT DOCUMENTS

| | | | |
|---|---|---|---|
| 11,359,582 B1* | 6/2022 | Dudar | F02M 25/0836 |
| 2018/0066595 A1 | 3/2018 | Dudar et al. | |
| 2021/0262418 A1* | 8/2021 | Kawanishi | F02M 25/0872 |

OTHER PUBLICATIONS

Partial International Search Report for International Application No. PCT/US2022/039552 dated Nov. 16, 2022.

* cited by examiner

EVAPORATIVE EMISSIONS LEAK CHECK MODULE WITH INTEGRATED CONTROL AND COMMUNICATION SYSTEM

CROSS-REFERENCE TO RELATED APPLICATION

This application claims priority to U.S. Provisional Application No. 63/247,873 filed Sep. 24, 2021.

TECHNICAL FIELD

This disclosure relates to a leak detection module (LDM) for an evaporative emissions system. In one example, the disclosure relates to an LDM controller and a method for testing the internal combustion engine evaporative emissions system for leaks using the LDM controller.

SUMMARY

In one exemplary embodiment, a leak detection module (LDM) includes a housing, a canister valve solenoid (CVS) that is arranged within the housing and in fluid communication along a first fluid passageway between first and second ports. The CVS is movable between open and closed positions. The module also includes a pump that is arranged within the housing and is in fluid communication with the first and second ports. The module further includes a pressure sensor that is in fluid communication with at least one of the first and second ports. The module further includes a first controller that is arranged in the housing and is in communication with the pump, the CVS and the pressure sensor. The first controller is configured to run an evaporative emissions system leak detection procedure using the pump and operating the CVS between the open and closed positions to monitor a pressure within the module with the pressure sensor. The first controller is configured to communicate a result based upon the monitored pressure to a second controller that is arranged outside the housing and remotely from the module.

In a further embodiment of any of the above, the pump is arranged in fluid communication along a second fluid passageway between the first and second ports. The first and second fluid passageways are parallel to one another. The pressure sensor is in fluid communication with at least one of the first and second fluid passageways.

In a further embodiment of any of the above, the first port is a canister port that is configured to be fluidly connected to a charcoal canister. The second port is an atmospheric port that is configured to provide substantially atmospheric pressure.

In a further embodiment of any of the above, the module includes a CVS check that is arranged within the housing and in the second fluid passageway that is fluidly between the first port and the pump. The CVS check is movable between open and closed positions. The first controller is in communication with CVS check and configured to command the CVS check between its open and closed positions.

In a further embodiment of any of the above, the housing includes first and second housing portions that are sealed to one another and enclose the first controller, the pump, the CVS, the CVS check and the pressure sensor.

In a further embodiment of any of the above, the first and second port are provided by the housing, and include an electrical connector that is provided by the housing and is in electrical communication with the first controller, the pump, the CVS, the CVS check and the pressure sensor.

In a further embodiment of any of the above, the first and second housing portions are permanently joined to one another by an adhesive and/or a weld.

In a further embodiment of any of the above, the module includes a temperature sensor that is arranged within the housing and is in fluid communication with at least one of the first and second ports. The first controller is in communication with the temperature sensor.

In another exemplary embodiment, an evaporative emissions system includes the leak detection module, the system includes an engine that is configured to provide vehicle propulsion. A fuel tank is configured to contain fuel and fuel vapors are selectively supplied to the engine. A charcoal canister is configured to store the fuel vapors from the fuel tank. The first port is in fluid communication with the charcoal canister. A fuel tank isolation valve is fluidly provided between fuel tank and the charcoal canister. A purge valve is in fluid communication with the charcoal canister and configured to selectively provide the fuel vapors to an engine in response to a purge command. The first controller is an LDM controller and the second controller is an engine controller that is configured to operate the engine.

In a further embodiment of any of the above, the LDM controller and the engine controller are arranged in different housings that are separate and discrete from one another.

In a further embodiment of any of the above, the evaporative emissions system leak detection procedure is performed with the engine controller OFF.

In a further embodiment of any of the above, the LDM controller is in a low power mode during a fuel tank stabilization period.

In another exemplary embodiment, a method of performing an evaporative emissions system leak test includes a test procedure initiated with a first controller when a second controller is in a sleep state or an OFF state, the first controller commanded with a canister valve solenoid (CVS) closed and pump to operate to pressurize or depressurize an evaporative system, a pressure monitored in the evaporative, and a test result stored based upon the pressure in the first controller to later be transmitted to the second controller when in an ON state.

In a further embodiment of any of the above, the method includes a step of waking a first controller after a first condition is met, and performing the commanding step after the waking step.

In a further embodiment of any of the above, the first condition is fuel tank stabilization period.

In a further embodiment of any of the above, the second controller is an engine controller that is configured to regulate operation of an internal combustion engine.

In a further embodiment of any of the above, the evaporative emissions systems includes a housing. The CVS is arranged within the housing and is in fluid communication along a first fluid passageway between first and second ports. The CVS is movable between open and closed positions. The pump is arranged within the housing and is in fluid communication with the first and second ports. A pressure sensor is in fluid communication with at least one of the first and second ports. The pressure sensor is configured to monitor the pressure. The first controller is arranged in the housing and is in communication with the pump, the CVS and the pressure sensor.

In a further embodiment of any of the above, the pump is arranged in fluid communication along a second fluid passageway between the first and second ports. The first and second fluid passageways are parallel to one another, and the pressure sensor is in fluid communication with at least one of the first and second fluid passageways.

In a further embodiment of any of the above, the first port is a canister port that is configured to be fluidly connected to a charcoal canister. The second port is an atmospheric port that is configured to provide substantially atmospheric pressure.

In a further embodiment of any of the above, the method includes a CVS check that is arranged within the housing and in the second fluid passageway fluidly between the first port and the pump. The CVS check is movable between open and closed positions. The first controller is in communication with CVS check and is configured to command the CVS check between its open and closed positions.

BACKGROUND

Evaporative emissions systems have long been required for gasoline powered vehicles. The system must undergo a periodic leak test during or after a vehicle drive cycle to ensure that fuel vapors will not leak into the atmosphere. The gasoline engine, a pump, or fuel tank temperature change is used either to create a vacuum or pressurize the system. Various valves may be closed during this test procedure to maintain system pressure, and the pressure is monitored to determine if there are any leaks.

In one typical system, the engine controller, which is used to control the vehicle's internal combustion engine, directly operates the emissions leak test component, generates any fault codes, and stores those codes. Some leak test systems may take up to a half an hour or more, which can require a significant amount of power as various components within the system must stay energized during the duration of the test.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1:
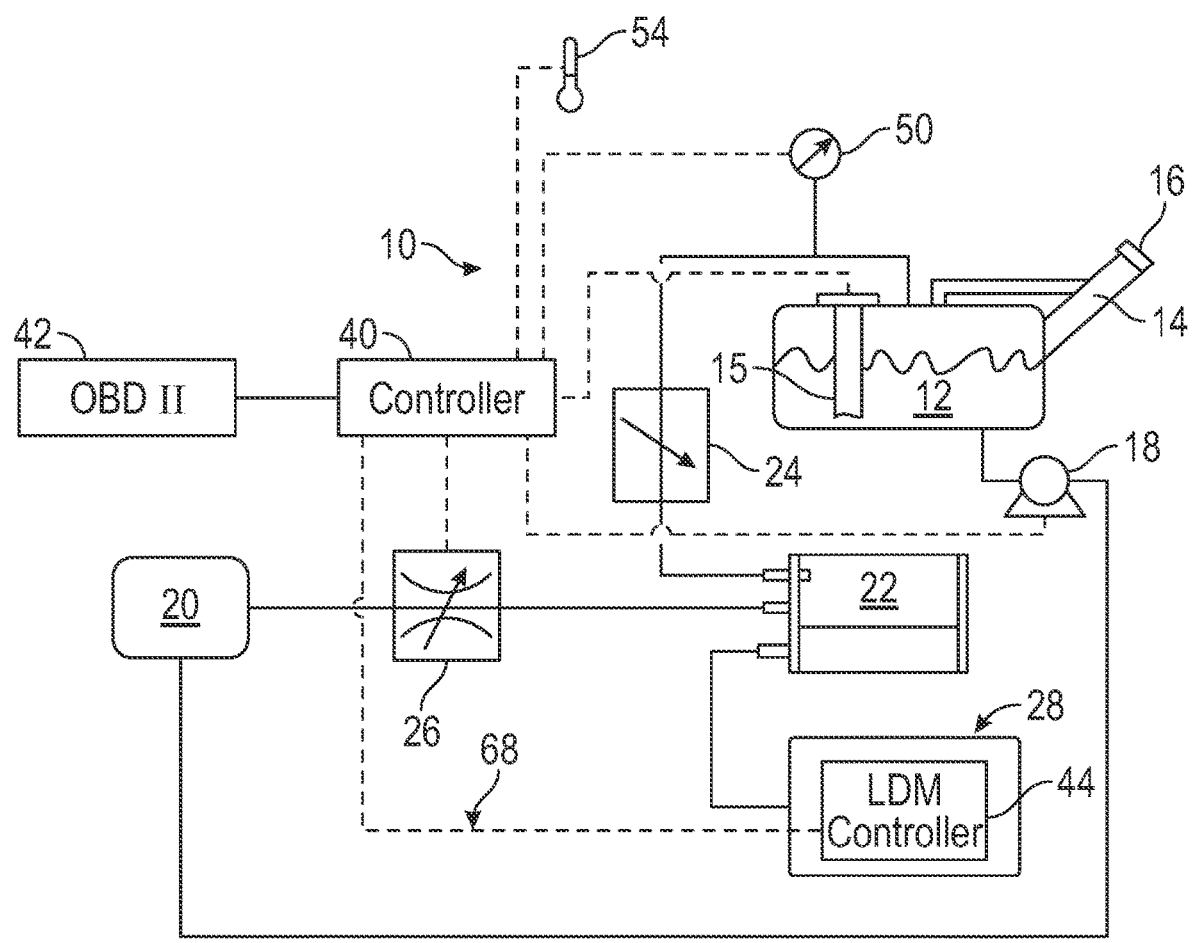
FIG. 1 schematically illustrates portions of one example evaporative fuel system.

FIG. 1 schematically illustrates a portion of an example evaporative fuel system 10. It should be understood that other types of systems may be used. The system 10 includes a fuel tank 12 having a fuel filler 14 with a fill cap 16. A fuel pump 18 supplies gasoline, for example, from the fuel tank 12 to an internal combustion engine 20, which provides propulsion to a vehicle. A fuel level sensor 15 is in communication with a controller 40, which may be an engine controller, and measures a level of fuel within the fuel tank 12, which also correlates to an amount of fuel vapor within the fuel tank 12.

The system 10 is configured to capture and regulate the flow of fuel vapors within the system. In one example, a fuel tank isolation valve (FTIV) 24 is arranged fluidly between the fuel tank 12 and a charcoal canister 22, which captures and stores fuel vapors for later use by the engine 20. A purge valve 26 is fluidly connected between the canister 22 and the engine 20. In one example, the controller 40 regulates a position of the purge valve 26 during engine operation in response to a purge command from the engine controller 40, for example, to selectively provide the fuel vapors to the engine 20 during fuel combustion to make use of these fuel vapors.

Regarding the evaporative emissions system, the integrity of the system 10 must be periodically tested to ensure no fuel vapor leakage. One type of system 10 uses a leak detection module (LDM) 28, which can be used to pull a vacuum and/or pressurize the system to determine whether a leak exists, for example, using a pressure transducer 52. In one example leak test procedure, the purge valve 26 is closed and the LDM controller 44 operates the leak detection module 28 to evacuate or pressurize the system. Another pressure transducer 50 may be used to monitor the pressure of fuel vapors within the fuel tank 12 during other conditions.

An ambient temperature sensor, which is optional, is in communication with the LDM controller 44. In one example, the temperature sensor 48 is arranged within a housing 46 and in fluid communication with at least one of the first and second ports 64, 66. In another example, the temperature sensor 54 is arranged outside the LDM 28. The temperature sensor may be useful for quantify heat transfer characteristics of the fuel vapor within the fuel tank 12 relative to surrounding atmospheric temperature.

The LDM 28 has its own controller, i.e., LDM controller 44, separate and discrete from the engine controller 40. The controllers 40, 44 are arranged remotely from one another is separate housings. Typically, the engine controller 40 is arranged at or near the vehicle's engine bay, and the LDM controller is arranged near the fuel tank 12 and/or charcoal canister 22, which is often at the rear of the vehicle. By using a separate LDM controller 44, the computation and control algorithms for leak diagnostics can be performed outside the engine controller 40, which can greatly simplify the engine controller's programming and I/O hardware. For example, instead of using eight wires from the LDM 28 to the engine controller 40, only two wires may be used between the engine and LDM controllers 40, 44 (i.e., two CAN bus wires; see at 68 in FIG. 2) Additionally, the overall power consumption during a leak test procedure may be reduce when using a separate LDM controller 44.

Figure 2A:
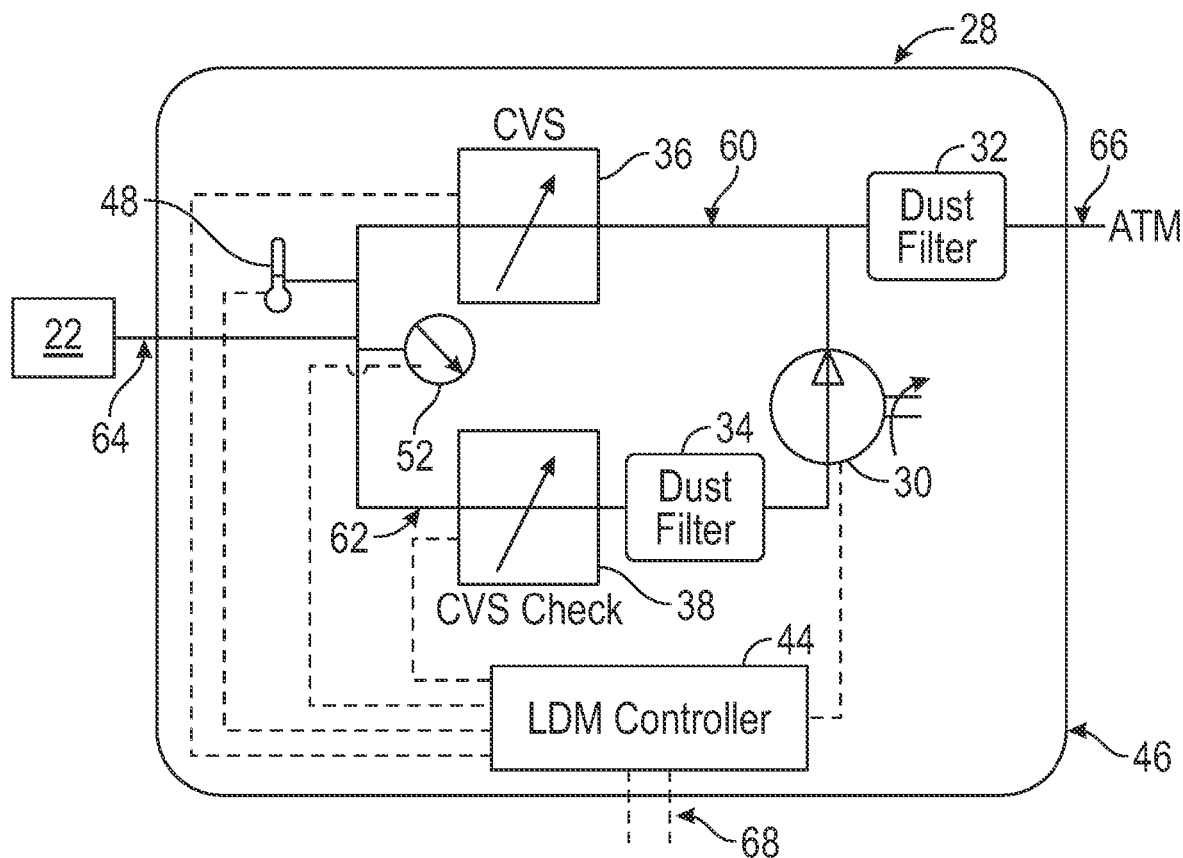
FIG. 2A is a schematic view of a leak detection module (LDM) for the system shown in FIG. 1.

The LDM 28 is schematically shown in FIG. 2A. The LDM 28 includes a pump 30 arranged in a housing. One example pump is disclosed in Provisional Application Ser. No. 62/910,708 filed on Oct. 4, 2019, entitled "PUMP FOR EVAPORATIVE EMISSIONS SYSTEM", which is incorporated herein by referenced in its entirety. Some customers prefer a system that operates using a vacuum, while other customers prefer a system that is pressurized. The rotational direction of the pump determines whether the system is pressurized or a vacuum is applied. So, to provide a pressurized evaporative emissions system test, the pump 30 will draw air from a second port 66 in fluid communication with atmosphere and through a filter 32 and direct the air towards the canister 22. Another filter 34 may be provided on the other side of the pump 30 to protect the pump from debris. To provide a depressurized or negative pressure evaporative emissions system test (i.e., vacuum), the pump 30 will draw air from the canister 22 and out to the atmosphere through the second port 66.

When the LDM 28 is not performing a leak check of the fuel system 10, a canister valve solenoid (CVS) 36 is in an open position to allow air to pass through a first fluid passageway 60 between the rest of the system 10 and atmosphere. This enables the system 10 to draw air from the atmosphere through second port 66 as needed. The CVS 36 is arranged within the housing 46 and in fluid communication along a first fluid passageway 60 between first and second ports 64, 66.

When the LDM 28 is performing a leak test of the of the fuel system 10, the CVS 36 is in a closed position, which provides a second fluid passageway 62 on the side of the canister 22. A CVS check valve 38 is arranged in the second fluid passageway 62 and selectively blocks the canister 22 from the pump 30 and atmosphere via the second port 66. The pump 30 is arranged in fluid communication along the second fluid passageway 62 between the first and second ports 64, 66. The first and second fluid passageways 60, 62 are parallel to one another, and the pressure sensor 52 is in fluid communication with at least one of the first and second fluid passageways 60, 62 and first and second fluid ports 64, 66. The pressure transducer 52 is arranged to read the pressure in the second fluid passageway 62 when the CVS 36 is closed, although the pressure transducer can be used for other purposes.

Figure 2B:
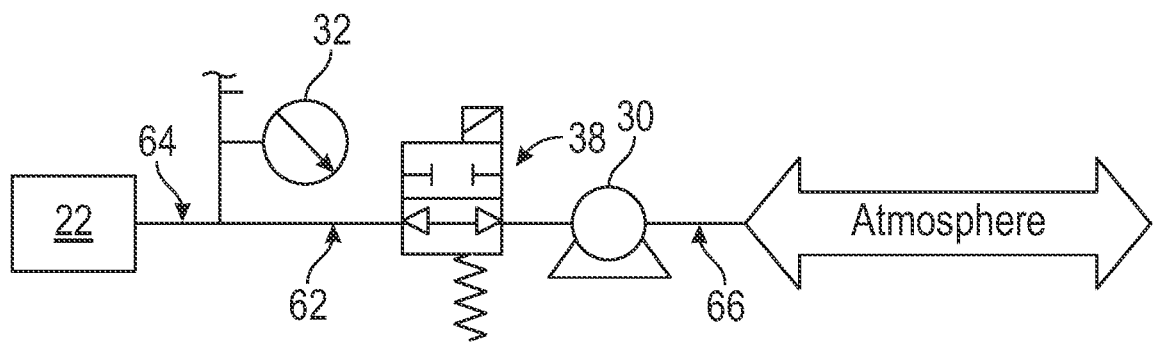
FIG. 2B is a schematic of the LDM configured to operate the system at a negative pressure (vacuum) or at a positive pressure (pressurized) during a leak test procedure.

The LDM 28 contains the hardware and software necessary to determine if the system 10 has a leak to atmosphere. During a leak test, depending upon how the CVS check valve is configured the pump 30 can either create a negative pressure (vacuum) or a positive pressure in the evaporative emissions system as described above. FIG. 2B schematically illustrates the CVS check valve 38 that can be used for a negative pressure leak or for a positive pressure leak test. In one example, the CVS check valve 38 is a 2-way, 2-position valve with solenoid closure and spring open to a normally open position. The leak boundary of the system 10 includes the fuel filler 14 and cap 16, the purge valve 26, the fresh air side of the canister 22 (side connected to the LDM 28 at first port 64), the vapor dome of the fuel tank 12, and vapor lines connecting all components, including the second fluid passageway 62.

Figure 3A:
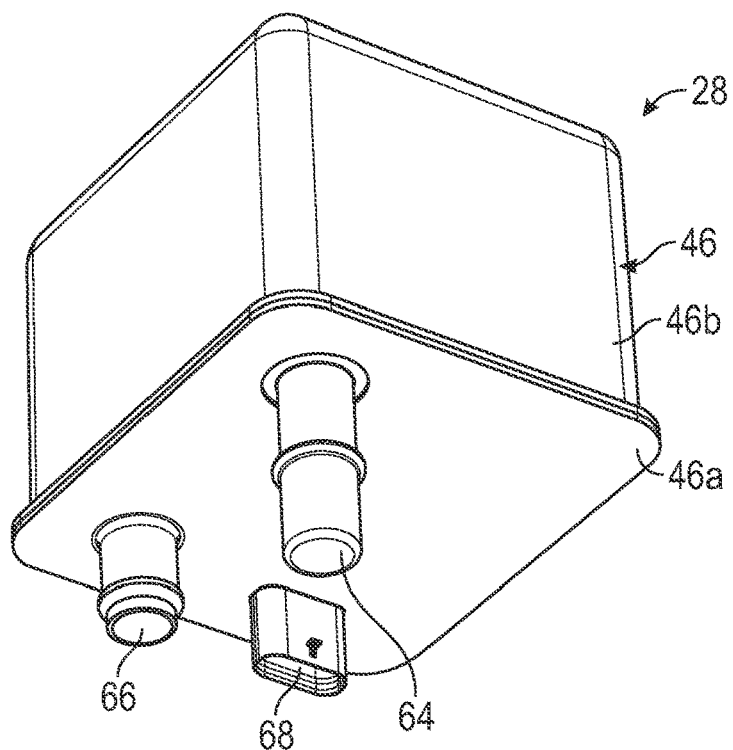
FIG. 3A is a perspective view of the LDM illustrating first and second ports and an electrical connector.
Figure 3B:
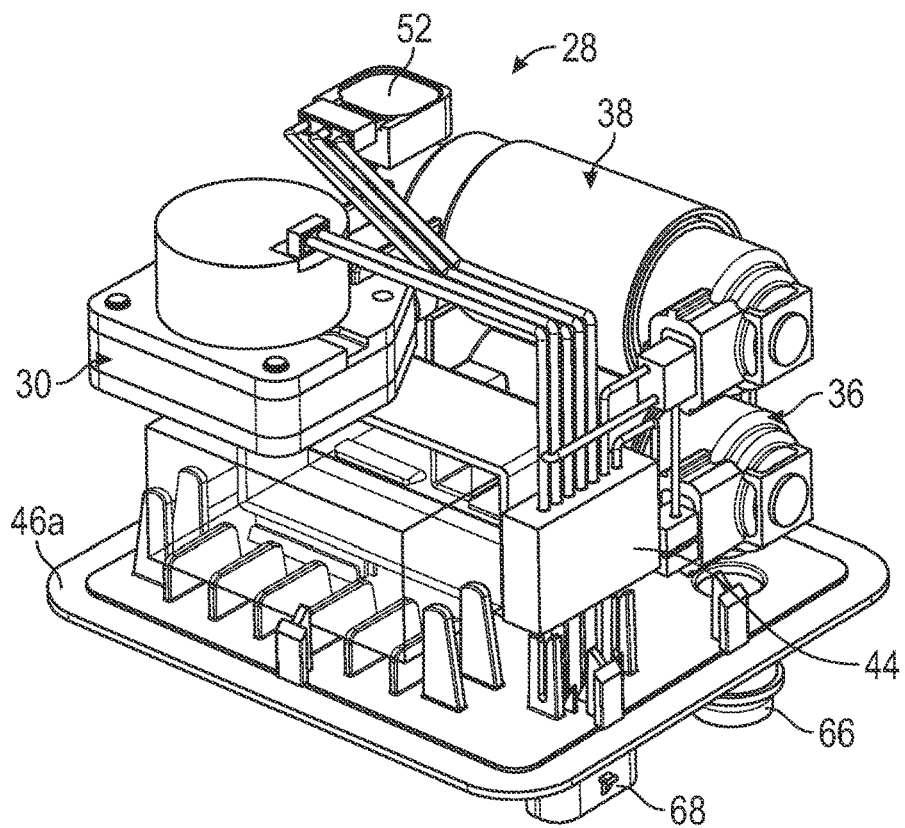
FIG. 3B is a perspective view of the LDM shown in FIG. 3A with a housing portion removed to illustrate various LDM components.

As best shown in FIGS. 3A and 3B, the LDM 28 includes housing 46 having first and second housing portions 46a, 46b secured about the various LDM components. That is, the first and second housing portions 46a, 46b are sealed to one another and enclose the LDM controller 44, the pump 30, the CVS 36, the CVS check valve 38 and the pressure sensor 52. In one example, the first and second housing portions 46a, 476b are permanently joined to one another by and adhesive and/or a weld. First and second port 64, 66 are provided by the housing 46 (FIGS. 2A and 3A). The first port 64 is a canister port configured to be fluidly connected to a charcoal canister 22, and the second port 66 is an atmospheric port configured to provide substantially atmospheric pressure. An electrical connector 68 is also provided by the housing 46 and is in electrical communication with the LDM controller 44, the pump 30, the CVS 36, the CVS check valve 38 and the pressure sensor 52, as shown in FIG. 3B. The electrical connector 68 may include four pins: two pins for communication to the engine controller 40, and two pins for receiving power from the battery and a ground connection.

The LDM controller 44 is used to either A) make a determination if the pressure transducer reading is a pass/fail and directly return a pass or fail indication to the engine controller 40, or B) collect the pressure transducer 52 information and directly report that to the engine controller 40 so the engine controller 40 can make the determination if it is a pass/fail. However, this pressure reading is indicative of a pass/fail. During the leak test, the pressure transducer 52 is in fluid communication with the second fluid passageway 62 and monitors the pressure condition generated by the pump 30 in the system 10. The pressure transducer 52 is in communication with the LDM controller 44, which determines if there is a variation in pressure over a predetermined amount of time in the evaporative emissions system that might indicate a leak. A change in pressure detected by the pressure transducer 52, which is monitored by the LDM controller 44, can be indicative of a leak. An OBDII system 42 communicates and/or is integrated with the engine controller 40 and uses the pressure information from the LDM controller to generate engine malfunction codes that may be stored and for illuminating a "check engine" light on the vehicle instrument panel indicating vehicle service is needed.

The LDM controller 44 and OBDII system 42 may be integrated or separate, but the engine controller 40 is separate from the LDM controller. In terms of hardware architecture, such the controllers can include a processor, memory, and one or more input and/or output (I/O) device interface(s) that are communicatively coupled via a local interface. The local interface can include, for example but not limited to, one or more buses and/or other wired (e.g., CAN, LIN and/or LAN) or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controllers may be a hardware device for executing software, particularly software stored in memory. The processor can be a custom made or commercially available processor, a central processing unit (CPU), an auxiliary processor among several processors associated with the controllers, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, etc.). Moreover, the memory may incorporate electronic, magnetic, optical, and/or other types of storage media. The memory can also have a distributed architecture, where various components are situated remotely from one another, but can be accessed by the controller.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

When the controllers are in operation, its processor can be configured to execute software stored within the memory, to communicate data to and from the memory, and to generally control operations of the computing device pursuant to the software. Software in memory, in whole or in part, is read by the processor, perhaps buffered within the processor, and then executed.

The above-described system 10, LDM 28 and method of operation are exemplary only. As can be appreciated, proper operation of the system 10 is highly dependent on desired operation of the various fluid valves (here, pneumatic), which must reliably open and close when commanded by the LDM controller 44 to communicate and block flow when needed during both the evaporative emissions system test procedure and normal engine operation.

Figure 4:
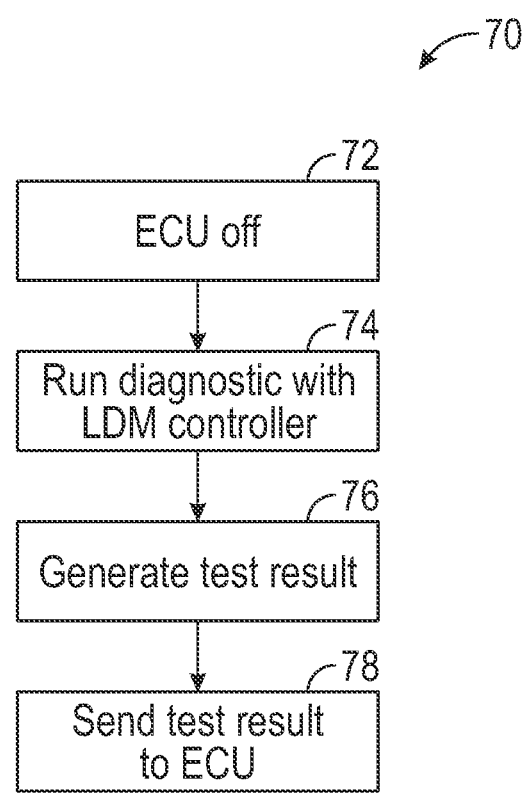
FIG. 4 is a flowchart depicting an evaporative emissions system leak test method.

A method of performing an evaporative emissions system leak test is shown at 70 in FIG. 4. In one example, with the engine controller 40 in a sleep state or an OFF state (block 72), the diagnostic test procedure is initiated with the LDM controller 44 (block 74). In one example, the test procedure includes the LDM controller 44 commanding the CVS 36 closed and operating the pump 30 to pressurize or depressurize the evaporative system 10. The pressure within the system 10 is monitored using the pressure sensor 52 to determine if there is a change in pressure that is indicative of a system leak. A test result is stored in the LDM controller 44 based upon the monitored pressure (block 76). The test result can be sent to the engine controller 40 at a later time when in an operational, ON state (block 78), and a diagnostic trouble code (DTC) can be generated by the OBDII system 42.

Figure 5:
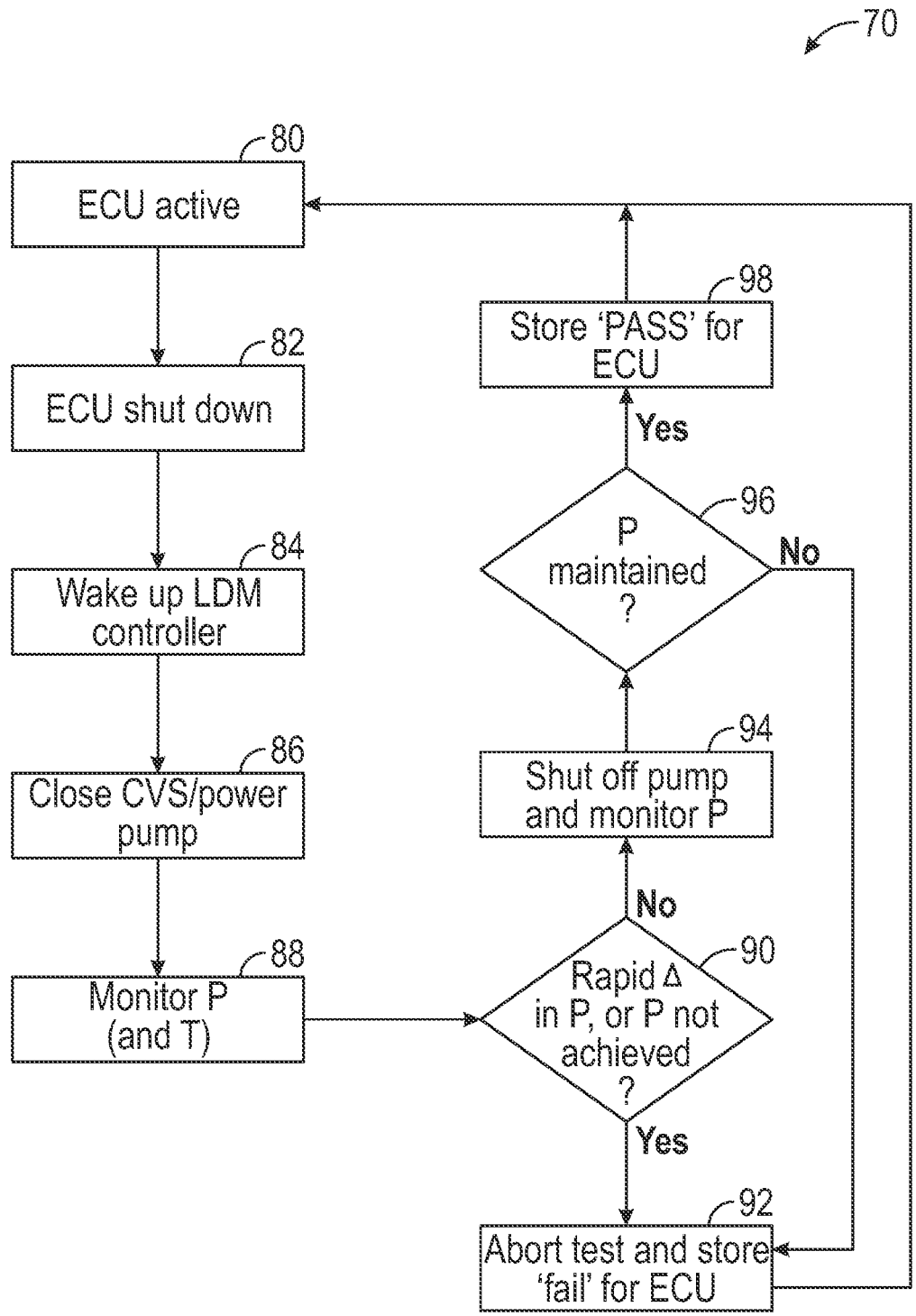
FIG. 5 is a flowchart illustrating one example leak test method in more detail.

In a more detailed example of the method 70 illustrated in FIG. 5, the engine controller 40 shuts down (block 82) after being active during normal engine operation (block 80) in which the LDM controller 44 is OFF or in sleep mode. The LDM controller 44 may stay in a sleep mode for 3-5 hours after the engine is shut down and is woken (block 84) after a first condition is met, such as a minimum fuel tank stabilization period. The LDM controller 44 commands the CVS 36 closed and operates the pump 30 to obtain a desired test pressure (block 86). The CVS check valve 38 is then closed to maintain the desired test pressure within the system 10. The pressure (and temperature, if desired) within the system 10 is monitored (block 88).

If there is a rapid change in pressure detected by the pressure sensor 52 or the desired pressure cannot be achieved by the pump 30 within a predetermined time (block 90), the test is aborted and failure code stored as these conditions are indicative of a large leak or system failure (block 92). If there is not a rapid change in pressure and the desired pressure can be met within the predetermined time, the pump 30 is shut off and the pressure sensor 52 continues to monitor system pressure (block 94). This allows for a "fast failure", which saves diagnostic time and vehicle battery power. A pressure rise over atmospheric pressure may indicated a refueling event, in which case the LDM 28 aborts the test and may attempt another test cycle before storing a "FAIL" code. Assuming the system pressure is maintained for the test duration (block 96), then the system 10 passes the leak test and the result is stored (block 98).

The LDM controller 44 communicates the result (PASS or FAIL) based upon the monitored pressure to the engine controller 40 at the next ignition key "ON". The engine controller 40 is arranged outside the housing 46 and remotely from the LDM 28.

The LDM controller 44 may also be used to perform diagnostics on the various components within the LDM 28 to determine a failure mode of those components (e.g., short, open, resistance out of range). However, the LDM 28 may be designed such that it is not serviceable if the housing 46 cannot be opened by non-destructive means, in which case the entire LDM is replaced in the event of a component failure.

The LDM 28 is one optional system for leak detection where active leak testing is desired. Thus, many LDM components and their illustrated connections may be omitted. For example, other systems use only the vacuum of the internal combustion engine for leak testing, such as a hybrid vehicle relying on "engine off natural vacuum" (EONV), which relies on the natural pressure/vacuum decay in the system for leak testing. So, no pump or CVS check valve are needed. But the methods illustrated in FIGS. 4 and 5 may still be used, except block 86 would be omitted and block 94 would simply monitor the system pressure, as no pump is used. For such systems, a CVS would be used to selectively close off the charcoal canister 22 via control signal from the LDM controller 44 so that the pressure in the system can be monitored.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples. For example, the disclosed pump may be used in applications other than vehicle evaporative systems.

Although an example embodiment has been disclosed, a worker of ordinary skill in this art would recognize that certain modifications would come within the scope of the claims. For that reason, the following claims should be studied to determine their true scope and content.

What is claimed is:

1. A leak detection module (LDM) comprising:
   a housing;
   a canister valve solenoid (CVS) arranged within the housing and in fluid communication along a first fluid passageway between first and second ports, the CVS movable between open and closed positions;
   a pump arranged within the housing and in fluid communication with the first and second ports;
   a pressure sensor in fluid communication with at least one of the first and second ports; and
   a first controller arranged in the housing and in communication with the pump, the CVS and the pressure sensor, the first controller configured to run an evaporative emissions system leak detection procedure using the pump and operating the CVS between the open and closed positions to monitor a pressure within the module with the pressure sensor, the first controller configured to communicate a result based upon the monitored pressure to a second controller arranged outside the housing and remotely from the module.

2. The module of claim 1, wherein the pump is arranged in fluid communication along a second fluid passageway between the first and second ports, the first and second fluid passageways are parallel to one another, and the pressure sensor is in fluid communication with at least one of the first and second fluid passageways.

3. The module of claim 2, wherein the first port is a canister port configured to be fluidly connected to a charcoal canister, and the second port is an atmospheric port configured to provide substantially atmospheric pressure.

4. The module of claim 2, comprising a CVS check arranged within the housing and in the second fluid passageway fluidly between the first port and the pump, the CVS check movable between open and closed positions, the first controller in communication with CVS check and configured to command the CVS check between its open and closed positions.

5. The module of claim 4, wherein the housing includes first and second housing portions sealed to one another and enclosing the first controller, the pump, the CVS, the CVS check and the pressure sensor.

6. The module of claim 5, wherein the first and second port are provided by the housing, and comprising an electrical connector provided by the housing and in electrical communication with the first controller, the pump, the CVS, the CVS check and the pressure sensor.

7. The module of claim 5, wherein the first and second housing portions are permanently joined to one another by an adhesive and/or a weld.

8. The module of claim 1, comprising a temperature sensor arranged within the housing and in fluid communication with at least one of the first and second ports, the first controller in communication with the temperature sensor.

9. An evaporative emissions system comprising the leak detection module of claim 1, the system comprising:
an engine configured to provide vehicle propulsion;
a fuel tank configured to contain fuel and fuel vapors selectively supplied to the engine;
a charcoal canister configured to store the fuel vapors from the fuel tank, the first port in fluid communication with the charcoal canister;
a fuel tank isolation valve fluidly provided between fuel tank and the charcoal canister;
a purge valve in fluid communication with the charcoal canister and configured to selectively provide the fuel vapors to an engine in response to a purge command; and
wherein the first controller is an LDM controller and the second controller is an engine controller configured to operate the engine.

10. The system of claim 9, wherein the LDM controller and the engine controller are arranged in different housings that are separate and discrete from one another.

11. The system of claim 10, wherein the evaporative emissions system leak detection procedure is performed with the engine controller OFF.

12. The system of claim 11, wherein the LDM controller is in a low power mode during a fuel tank stabilization period.

13. A method of performing an evaporative emissions system leak test, comprising:
initiating a test procedure with a first controller when a second controller is in a sleep state or an OFF state;
commanding with the first controller a canister valve solenoid (CVS) closed and pump to operate to pressurize or depressurize an evaporative system;
monitoring a pressure in the evaporative; and
storing a test result based upon the pressure in the first controller to later be transmitted to the second controller when in an ON state.

14. The method of claim 13, comprising a step of waking a first controller after a first condition is met, and performing the commanding step after the waking step.

15. The method of claim 14, wherein the first condition is fuel tank stabilization period.

16. The method of claim 13, wherein the second controller is an engine controller configured to regulate operation of an internal combustion engine.

17. The method of claim 13, wherein the evaporative emissions systems includes:
a housing;
the CVS is arranged within the housing and in fluid communication along a first fluid passageway between first and second ports, the CVS movable between open and closed positions;
the pump arranged within the housing and in fluid communication with the first and second ports;
a pressure sensor in fluid communication with at least one of the first and second ports, the pressure sensor configured to monitor the pressure; and
the first controller is arranged in the housing and in communication with the pump, the CVS and the pressure sensor.

18. The method of claim 17, wherein the pump is arranged in fluid communication along a second fluid passageway between the first and second ports, the first and second fluid passageways are parallel to one another, and the pressure sensor is in fluid communication with at least one of the first and second fluid passageways.

19. The method of claim 18, wherein the first port is a canister port configured to be fluidly connected to a charcoal canister, and the second port is an atmospheric port configured to provide substantially atmospheric pressure.

20. The method of claim 18, comprising a CVS check arranged within the housing and in the second fluid passageway fluidly between the first port and the pump, the CVS check movable between open and closed positions, the first controller in communication with CVS check and configured to command the CVS check between its open and closed positions.

* * * * *